United States Patent

[11] 3,630,531

[72] Inventor Pasquale C. Bondi
        Revere, Mass.
[21] Appl. No. 32,076
[22] Filed Apr. 27, 1970
[45] Patented Dec. 28, 1971
[73] Assignee General Electric Company

[54] SHAFT SEAL
     5 Claims, 2 Drawing Figs.
[52] U.S. Cl. .................................................. 277/117,
                                                277/152, 277/205
[51] Int. Cl. ......................................... F16j 15/00,
                                                F16j 15/48
[50] Field of Search ............................................. 277/102,
                                      205, 144, 117, 152, 148, 118

[56]        References Cited
        UNITED STATES PATENTS
3,520,542  7/1970  Fruehauf ..................... 277/205 X
2,827,314  3/1958  Granberg et al. ............. 277/117
2,701,155  2/1955  Estel, Jr. ....................... 277/152
2,546,961  4/1951  Amero ......................... 277/62 X Primary Examiner—Samuel B. Rothberg
Attorneys—Derek P. Lawrence, Frank L. Neuhauser, Oscar B. Waddell, Joseph B. Forman and Edward S. Roman ABSTRACT: A shaft seal is disclosed in which the inner and outer lips of a U-cup sealing member are independently loaded against their respective contacted surfaces by loading rings independently biased in an axial direction.

INVENTOR.
PASQUALE G. BONDI

SHAFT SEAL

BACKGROUND OF THE INVENTION

A U-cup seal, which comprises a resilient inner lip adapted to seat on the cylindrical surface of a shaft and a resilient outer lip adapted to seat on a corresponding cylindrical surface in the shaft housing has, under prior practice, had its sealing lips loaded against their respective contacted surfaces by a single loading ring wedged between the inner and outer lips by an axially directed spring force. While operating satisfactorily in many situations, the loading method described has several shortcomings. In the usual application of such a seal, the inner lip thereof is subject to sliding contact or rotating motion relative to the shaft and the outer lip thereof is stationary in the shaft housing. The inner lip thus has a higher wear than does the outer lip, and after wear on the inner sealing lip reaches a certain point, the single loading ring can no longer wedge between the inner and outer lips far enough to adequately load the inner lip against its contacted surface. The seal thus tends to leak and must be replaced. A similar situation can occur with new parts when the tolerance stackup in an assembly permits the single-piece loading ring to wedge tightly against the outer sealing lip or the inner sealing lip only. A third situation in which the prior art configuration is limited is that in which side loads applied to the shaft to be sealed tend to deform the inner lip of the U-cup seal, permitting fluid leakage between the seal and the cylindrical surface of the shaft.

In response to the limitations above noted, applicant has invented a novel combination which includes a U-cup sealing member and side-loading means for loading the sealing lips of the sealing member against their respective contacted surfaces independently of the load on the other sealing lip. Thus, applicant has provided a combination which extends seal life, is considerably less sensitive to tolerance stackups in the overall actuator assembly, and exhibits an increased tolerance for side loads on the sealed shaft.

BRIEF SUMMARY OF THE INVENTION

Briefly stated, the invention is a shaft-sealing means which comprises a sealing member having a resilient inner annular lip and resilient outer annular lip and two independently acting bias means for biasing each of the said lips into sealing contact with its contacted surface. In one embodiment, the bias means comprises separate inner and outer annular loading rings wherein the inner loading ring is nested within the outer loading ring and each bias means includes separate spring means for exerting axial force on the loading rings.

BRIEF DESCRIPTION OF THE DRAWINGS

While the specification concludes with claims particularly pointing out and distinctly claiming the invention, it is believed that the invention will be more readily understandable by reference to the discussion below and the accompanying drawings in which:

DESCRIPTION OF THE PREFERRED EMBODIMENT

Figure 1:
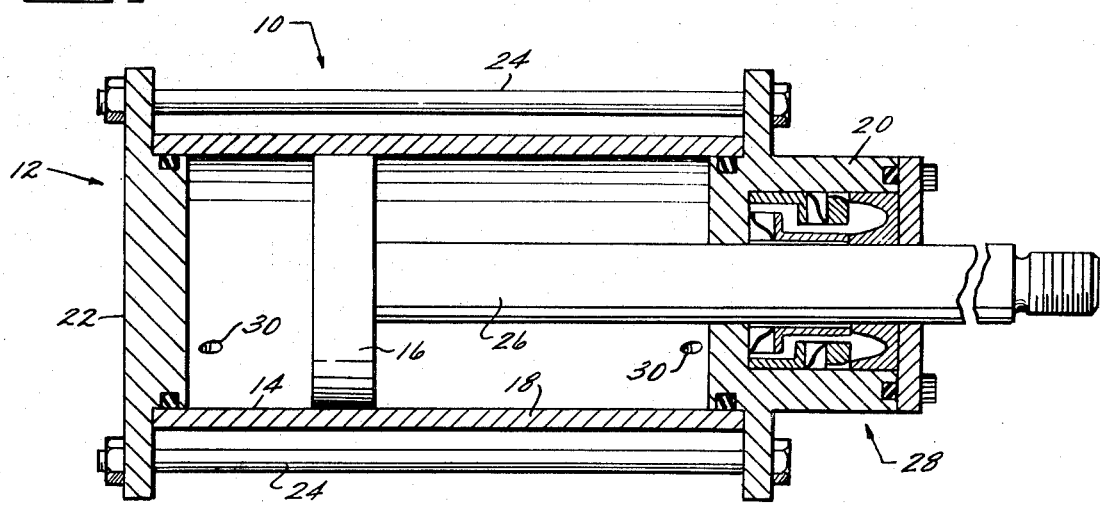
FIG. 1 is a section view of an actuator embodying the sealing means of this invention.

FIG. 1 shows an actuator 10 which comprises a housing 12 having a cylindrical bore 14 and a piston 16 slidably disposed in said bore 14. Housing 10 comprises barrel 18, end walls 20, 22, and tie rods 24 clamping barrel 18 between end walls 20, 22. An actuator rod 26 is connected to piston 16 and extends through end wall 20, end wall 20 being sealed against leakage around rod 26 by a shaft seal 28, which is the subject of this invention. A fluid inlet port 30 is disposed at each end of bore 14 to admit pressurized fluid into the actuator.

Figure 2:
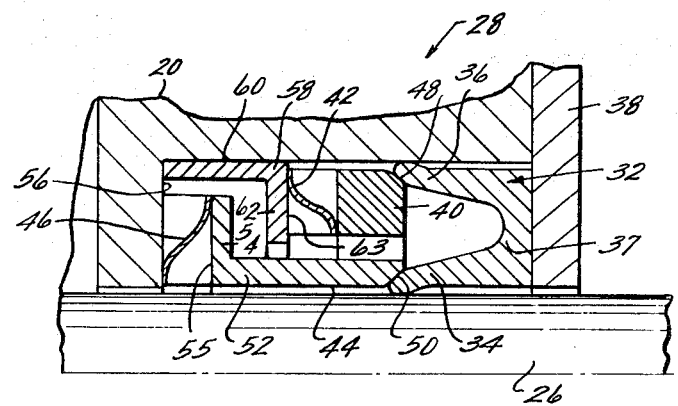
FIG. 2 is a fragmented section view on an enlarged scale of the sealing means of this invention.

FIG. 2 illustrates the shaft seal means 28 in detail. Means 28 comprises a sealing member 32 which is a standard U-cup device having an inner lip 34 and an outer lip 36 joined by an annular wall 37, the annular wall 37 being axially supported by an end plate 38 which is fastened to end wall 20. The resilient sealing lips 34, 36 are biased against their respective cylindrical contacted surfaces on shaft 26 and end wall 20 by bias means which comprise, in the case of the outer lip 36, a loading ring 40 and a spring 42, and in the case of the inner lip 34, an inner loading ring 44 and loading spring 46. Outer loading ring 40 is an annular ring which includes a frustoconical surface 48 to transmit a radial component of the axial force from spring 42 to lip 36. Inner loading ring 44 similarly includes a frustoconical surface 50 which functions in the same manner to load inner lip 34 against shaft 26.

To minimize space requirements, the sealing means components referred to above are constructed so that the inner lip 34 bias means are nested within the bias means for outer lip 36. In the configuration shown, nesting is achieved by a construction in which the inner loading ring 44 consists of a cylindrical shell 52 which terminates on one end by the frustoconical surface 50 and on the other end by an outwardly directed radial flange 54. Outer surface 55 of flange 54 is juxtaposed with spring 46, which in turn is supported in end wall 20 by a radial surface 56. The bias means for outer sealing lip 36 includes an outer spring support means 58 which comprises a cylindrical shell 60 axially supported by radial surface 56 and terminated on its axially unsupported end by an inwardly directed flange 62, shell 60 being closely telescoped over the outer periphery of flange 54 and the inside diameter of flange 62 being closely telescoped over the outer periphery of shell 52. Spring 42 is axially supported by the outside surface 63 of flange 62, and outer loading ring 40 is telescoped over the end of inner loading ring 44 cylindrical shell 52.

Any one of several types of springs could be specified for springs 42, 46 to axially load loading rings 40, 44 against their respective sealing lips. However, in keeping with the object of compactness of the assembly, washer-type spring devices such as Belleville or Wave washers are preferred.

It can be seen by reference to the drawings and descriptions above that the sealing means detailed in FIG. 2 is particularly adapted for independently loading the sealing lips 34, 36 of U-cup seal 32, and that as a result wear of the inner surface of sealing lip 34 requiring compensation by axial movement of loading ring 44 would receive such compensation without regard to wear or lack thereof on sealing lip 36. Similarly, any inaccuracies in machining frustoconical surfaces 48, 50 or other component inaccuracies contributing to unfavorable assembly tolerance stackups will be compensated for by the independent loading feature of the configuration so that upon initial assembly and throughout the wear life of seal 32 each of lips 34, 36 will be adequately biased against its respective contacted surface without regard to the dimensional condition of the other of the lips.

Having thus described a preferred embodiment of the invention, though not exhaustive of all possible equivalents, what is desired to be secured by letters patent is that which appears in the claims below.

What is claimed is:

1. In a device having a cylindrical shaft extending through a housing, a shaft seal comprising:

a sealing member having a resilient inner annular lip and a resilient outer annular lip, said inner lip being adapted for sealing contact with the cylindrical surface of said shaft and said outer lip being adapted for sealing contact with a cylindrical surface of said housing, at least one of said lips being adapted for movable engagement with its contacted surface;

an inner annular loading ring including a cylindrical shell terminated on one end by a frustoconical surface in contact with said inner lip so as to push said lip toward contact with the surface of said shaft; and terminated on the other end by an outwardly directed annular flange;

inner spring means for maintaining contact between said inner frustoconical surface and said inner lip;

an outer annular loading ring having a frustoconical surface in contact with said outer lip so as to push said lip toward contact with the surface of said housing; and outer spring means for maintaining contact between said outer frustoconical surface and said outer lip wherein said outer loading ring and outer spring means are telescoped over the cylinder portion of said inner loading ring, said shaft seal further including support means for axially supporting said outer spring means.

2. The shaft seal recited in claim 1 wherein said support means is an annular member comprising a cylindrical shell telescoped over said outwardly directed flange, said cylindrical shell terminating with an inwardly directed annular flange telescoped over said cylindrical portion of said inner loading ring.

3. An actuator, comprising:

a housing, a cylindrical shaft extending through one wall of said housing, means for moving said shaft relative to said housing, and a shaft seal comprising;

a sealing member having a resilient inner annular lip and a resilient outer annular lip, said inner lip contacting a cylindrical surface of said shaft and said outer lip contacting a cylindrical surface of said housing, at least one of said lips being adapted for movable engagement with its contacted surface, said sealing member having an annular wall connecting said lips and axially supported is said housing;

an inner annular loading ring including a cylindrical shell terminated on one end by a frustoconical surface in contact with said inner lip so as to push said lip toward contact with the surface of said shaft and terminated on the other end by an outwardly directed annular flange;

an inner spring means contacting the outside surface of said flange and supported by a radially oriented surface in said housing wherein said inner spring means maintains contact between said inner frustoconical surface and said inner lip;

an outer annular loading ring having a frustoconical surface in contact with said outer lip so as to push said lip toward contact with the surface of said housing; and an outer spring means for maintaining contact between said outer frustoconical surface and said outer lip.

4. The actuator recited in claim 3 wherein the outer loading ring is an annular ring terminated on one end by said frustoconical surface and terminated on the other end by an annular surface normal to the axis of said ring, the normal annular surface contacting the spring means for said outer loading ring, which spring means is supported by a support means in contact with said radially oriented surface.

5. The actuator recited in claim 4 wherein said support means is an annular member comprising a cylindrical shell telescoped over said outwardly directed flange, said cylindrical shell terminating on its end removed from said radially oriented surface with an inwardly directed annular flange, said inwardly directed flange supporting the outer loading ring spring means.

* * * * *